US010902829B2

(12) United States Patent
Alexanderson et al.

(10) Patent No.: US 10,902,829 B2
(45) Date of Patent: Jan. 26, 2021

(54) METHOD AND SYSTEM FOR AUTOMATICALLY CREATING A SOUNDTRACK TO A USER-GENERATED VIDEO

(71) Applicant: Sony Mobile Communications Inc., Tokyo (JP)

(72) Inventors: Petter Alexanderson, Bjärred (SE); Ola Thörn, Limhamn (SE); Käre Agardh, Lund (SE); Peter Isberg, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/483,580

(22) PCT Filed: Mar. 15, 2018

(86) PCT No.: PCT/IB2018/051740
§ 371 (c)(1),
(2) Date: Aug. 5, 2019

(87) PCT Pub. No.: WO2018/167706
PCT Pub. Date: Sep. 20, 2018

(65) Prior Publication Data
US 2019/0371289 A1 Dec. 5, 2019

(30) Foreign Application Priority Data

Mar. 16, 2017 (EP) ..................................... 17161396

(51) Int. Cl.
G10H 1/36 (2006.01)
G10H 1/00 (2006.01)
(52) U.S. Cl.
CPC ........... G10H 1/0025 (2013.01); G10H 1/368 (2013.01); G10H 2210/076 (2013.01);
(Continued)

(58) Field of Classification Search
CPC .............. G06F 3/014; G10H 2220/395; G10H 2220/455; G10H 2220/326;
(Continued)

(56) References Cited

U.S. PATENT DOCUMENTS 7,602,301 B1 * 10/2009 Stirling ................ A61B 5/1127
340/573.1
2011/0044483 A1 * 2/2011 Edgar .................. H04R 25/558
381/314
(Continued)

FOREIGN PATENT DOCUMENTS

WO 2015/168299 A1 11/2015
WO 2016/098430 A1 6/2016

OTHER PUBLICATIONS

International Search Report and Written Opinion from corresponding International Patent Application No. PCT/IB2018/051740, dated May 30, 2018; 13 pages.

Primary Examiner — Marlon T Fletcher
(74) Attorney, Agent, or Firm — Tucker Ellis LLP

(57) ABSTRACT

The invention relates to a system for automatically creating a soundtrack, comprising a camera device (1, 1') for recording a user-generated video, at least one wearable sensor (3, 3'), and a control unit (2, 2') in communication with the camera device (1, 1') and the at least one wearable sensor (3, 3'). The control unit (2, 2') is adapted to generate the soundtrack based on data gathered from the at least one wearable sensor (3, 3') during the recording of the user-generated video. The invention further relates to a method for automatically creating a soundtrack, computer program product, a computer readable memory storage unit computing arrangement or mobile device (1, 11) for executing the method.

10 Claims, 2 Drawing Sheets

(52) U.S. Cl.
CPC . *G10H 2220/321* (2013.01); *G10H 2220/391* (2013.01); *G10H 2220/395* (2013.01)

(58) Field of Classification Search
CPC ....... G10H 2240/131; G10H 2210/076; G10H 1/0033; G10H 1/368; G10H 2210/391; G10H 2240/325
See application file for complete search history.

(56) References Cited

U.S. PATENT DOCUMENTS

| | | | |
|---|---|---|---|
| 2015/0038806 A1* | 2/2015 | Kaleal, III | A61B 5/0205 600/301 |
| 2015/0067811 A1* | 3/2015 | Agnew | H04L 63/0807 726/9 |
| 2015/0093729 A1* | 4/2015 | Plans | A61B 5/0476 434/236 |
| 2015/0179157 A1 | 6/2015 | Chon | |
| 2015/0277559 A1* | 10/2015 | Vescovi | G06F 3/0416 345/173 |
| 2016/0098980 A1 | 4/2016 | Ercolano | |
| 2016/0173982 A1* | 6/2016 | Anderson | G10H 1/46 381/119 |
| 2016/0292881 A1* | 10/2016 | Bose | G06K 9/00342 |
| 2016/0367202 A1* | 12/2016 | Carter | A61B 5/7289 |
| 2016/0372096 A1 | 12/2016 | Lyske | |
| 2017/0262697 A1* | 9/2017 | Kaps | A63F 13/812 |
| 2017/0266492 A1* | 9/2017 | Koshida | A63B 69/00 |
| 2017/0323665 A1 | 11/2017 | Ikeda | |
| 2018/0001184 A1* | 1/2018 | Tran | H04N 5/2257 |
| 2018/0064356 A1* | 3/2018 | Mendenhall | A61B 5/0408 |
| 2018/0168905 A1* | 6/2018 | Goodall | A61N 1/36025 |
| 2018/0169411 A1* | 6/2018 | Goodall | A61N 1/36025 |
| 2018/0169412 A1* | 6/2018 | Goodall | A61N 1/36025 |
| 2019/0268771 A1* | 8/2019 | Seo | G06F 3/0346 |
| 2019/0328306 A1* | 10/2019 | Gluckman | A61B 5/0205 |
| 2019/0371289 A1* | 12/2019 | Alexanderson | G10H 1/368 |
| 2020/0019242 A1* | 1/2020 | Atlas | G06F 3/017 |

* cited by examiner

METHOD AND SYSTEM FOR AUTOMATICALLY CREATING A SOUNDTRACK TO A USER-GENERATED VIDEO

FIELD OF THE INVENTION

The present invention relates to a system for automatically creating a soundtrack. The invention further relates to a method for automatically creating a soundtrack, computer program product, a computer readable memory storage unit computing arrangement or mobile device for executing the method.

BACKGROUND ART

Every day, vast amounts of user-generated movie content are uploaded to well-known services like YouTube, Vimeo and similar communities. An essential component in a well-crafted movie is the movie soundtrack, which to a great extent affects the emotional response of the audience (Park, et al 2007, *Quantitative and Visual Analysis of the Impact of Music on Perceived Emotion of Film*, ACM Comput. Entertainment). This in turn has large impact on the popularity of the movie and the financial success, e.g. from commercial revenues to the author.

However, creating a soundtrack that harmonizes with the movie is a craft which is time-consuming and also requires the specific skill set of composing and sound editing. The recent years, a number of tools have been presented that makes this work faster and more easy for the amateur, e.g. XHAIL or MOODELIZER. These tools make the soundtrack creation easier, but it's still a matter of hours or days to produce the end result.

There is thus a need for a need in the industry for an easier way of creating an attractive soundtrack to a movie that is fast and easy for the everyday user who shoots user-generated movies with handheld devices.

SUMMARY OF THE INVENTION

It is an objective of the present invention to provide an improvement of the above technique and prior art. More particularly, it is an objective of this invention to provide an improved system for automatically creating a soundtrack to a user-generated video.

According to a first aspect, these and other objects, and/or advantages that will be apparent from the following description of embodiments, are achieved, in full or at least in part, by a system for automatically creating a soundtrack. The system comprises a camera device for recording a user-generated video, at least one wearable sensor, and a control unit in communication with the camera device and the at least one wearable sensor. The control unit of the system is adapted to generate the soundtrack based on data gathered from the at least one wearable sensor during the recording of the user-generated video.

A soundtrack is thereby possible to make in an automated fashion taking into account measured physical properties from the time period that the user-generated video is recorded. The user does not have to later on produce the sound track partly manual while consuming lots of time that could be used for other things as recoding more video. Also, the user does not have to learn any complicated software or learn anything about video editing. The mentioned objectives are thereby achieved.

The control unit may comprise a clock to be able to sync the sensor gathered data from the sensors to the timeline of the video.

The at least one sensor may be a sensor comprised in the group consisting of an accelerometer, a gyro, a magnetometer, a barometer, a galvanic skin response (GSR) sensor, a brain response sensor, facial electromyography sensors, visual aesthetics sensor, electroencephalogram (EEG) sensor, electrocardiogram (ECG) sensor, electromyogram (EMG) sensor, mechanomyogram (MMG) sensor, electrooculography (EOG) sensor, magnetoencephalogram (MEG) sensor, a pulse meter, a positioning device, and a blood analysis sensor. Each sensor may be used by itself to influence the music that is selected for the soundtrack for each point in time in the video so that the soundtrack reflects and has a direct connection to physical events during the recording of the user-generated video.

According to a second aspect the mentioned objects are achieved in full or at least in part by a method for automatically creating a soundtrack, comprising recording a user-generated video and, simultaneously, gathering data from at least one wearable sensor attached to a user, and communicating the user-generated video and the data to a control unit. The method is characterized by processing the gathered data in relation to a time-line of the user-generated video in the control unit, generating the soundtrack based on the processed data.

The generation of the soundtrack may be performed in real time as the user-generated video is recorded so that the user does not have to do anything at all after the recording of the user-generated video. The user simply selects a setting before recording the video to enable automatic generation of a soundtrack.

The processing may further be based on image analysis of the user-generated video. The music selected for the sound track may then be synchronized to graphical properties and changes of these properties in the user-generated movie.

The processing of the gathered data may further comprise calculating a property of the user comprised in the group consisting of speed, acceleration, vertical velocity, deceleration, impact, duration time, pulse, and blood sugar, brain activity, stress level, etc. The music is selected based on at least one music property in relation to the processed data and the time-line thereof, where the processed data in turn is based on the sensor data. The music property may be a music property comprised in the group consisting of: tempo, rhythm, melodic tension, consonance/dissonance, instrumentation, chord structure, and key changes. Music properties are thereby synchronised and harmonized with data obtained by the sensors or properties of the video to create an automated soundtrack that reflects the video and the actual events that the user experienced when shooting the user-generated video.

According to a third aspect the mentioned objects are achieved in full or at least in part by a computer program product comprising instructions adapted to carry out the method of the second aspect when executed by a device having processing capability.

According to a fourth aspect the mentioned objects are achieved in full or at least in part by a computer readable storage medium or memory storage unit comprising a computer program product according to the third aspect.

According to a fifth aspect the mentioned objects are achieved in full or at least in part by a computing arrangement or mobile apparatus comprising the computer readable storage medium of the fourth aspect, wherein the computing arrangement or mobile apparatus is arranged to execute the computer program product according to the third aspect. The computing arrangement or mobile apparatus may e.g. be a mobile phone or a handheld camera. If the recording device is connected to a network as e.g. the internet, the control unit and the processing of the gathered data may be located remotely in the network.

Effects and features of the second through fifth aspects of the present invention are largely analogous to those described above in connection with the first aspect of the inventive concept. Embodiments mentioned in relation to the first aspect of the present invention are largely compatible with the further aspects of the invention.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION OF PREFERRED EMBODIMENTS OF THE INVENTION

Figure 1A:
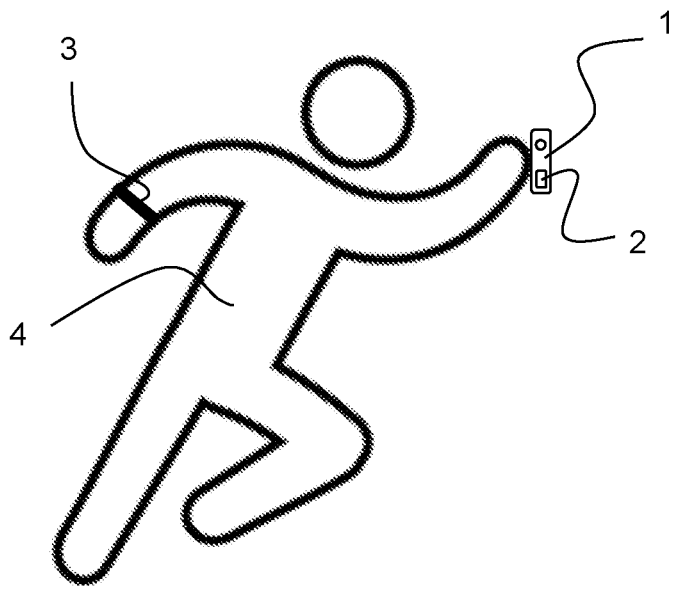
FIG. 1a is schematic view of a user and a first embodiment of a system for automatically creating a soundtrack.

FIG. 1a illustrates a running user 4 holding a camera device 1 containing a control unit 2. The user 4 has a wearable sensor 3 around his/her wrist. The sensor 3 could be an accelerometer, a gyro, a magnetometer, a barometer, a galvanic skin response sensor, a pulse meter, a positioning device, and/or a blood analysis sensor. The control unit 2 or the handheld device may also include a clock (not shown) as is conventional in most advanced handheld electronics. The camera device may e.g. be a mobile smart phone.

The camera device 1 records video at the same time as the wearable sensor records data. The data from the wearable sensor 3 and the video from the camera device is used by the control unit 2 to create a soundtrack to the user-generated video based on the sensor data and the user-generated video. The generated soundtrack may be embedded into the video file or saved as an audio file on a memory storage unit of the camera device or a memory storage unit of the control unit. The generation may be performed immediately after the user-generated video has been recorded, during the user-generated video is recorded or at a later point in time, e.g. on request by the user 4.

Figure 1B:
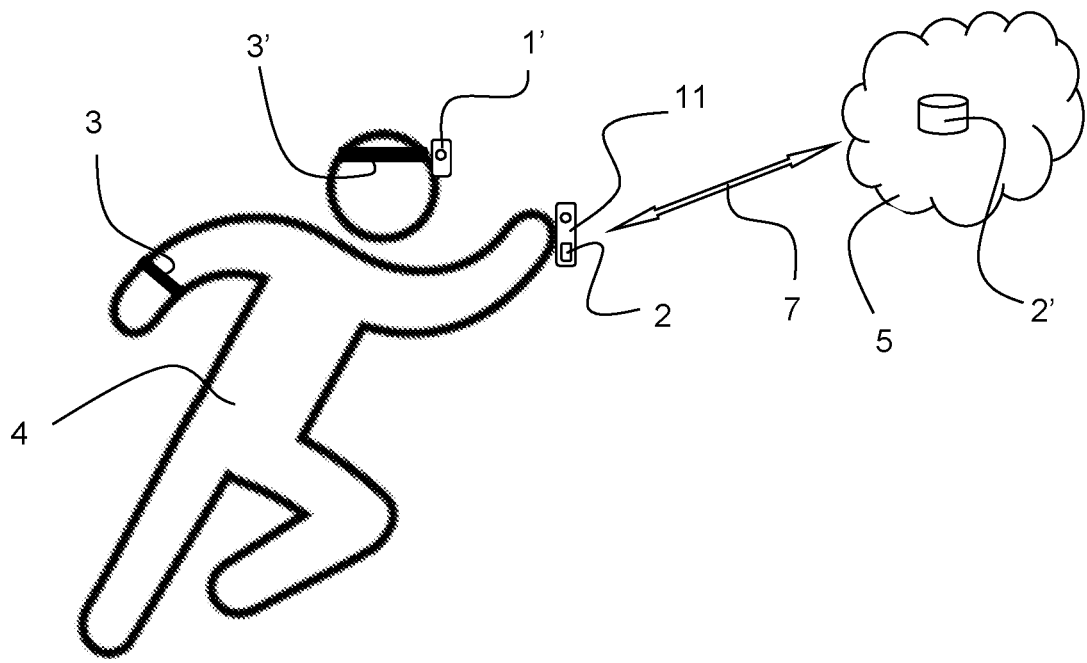
FIG. 1b is schematic view of a user and further embodiments of a system for automatically creating a soundtrack.

FIG. 1b illustrates further embodiments of the invention. A running user 4 has a camera device 1' attached to a strap around his/her head. A further mobile device 11, e.g. a mobile phone, contains a control unit 2. The user 4 has a wearable sensor 3 around his/her wrist and further wearable sensor 3' around his/her head. The sensors 3, 3' could be an accelerometer, a gyro, a magnetometer, a barometer, a galvanic skin response sensor, a pulse meter, a positioning device, and/or a blood analysis sensor. The control unit or the camera device may also include a clock (not shown) as is conventional in most advanced handheld electronics. The camera device may e.g. be a mobile smart phone. The arrow 7 illustrates that the mobile device 11 has a wireless connection to a network 5 where a further control unit 2' is located as an alternative to the control unit 2 of the mobile device 11.

The camera device 1' records video at the same time as one or both of the wearable sensors 3, 3' record data. The data from the wearable sensor(s) 3, 3' and the video from the camera device 1' is used by at least one of the control units 2, 2' to create a soundtrack to the user-generated video based on the sensor data and the user-generated video. The generated soundtrack may be embedded into the video file or saved as an audio file on a memory storage unit of the camera device1', the mobile device 11, a memory storage unit of the control unit 2 or a memory storage unit of the control unit 2' in the network. The generation may be performed by any of the control units 2, 2' immediately after the user-generated video has been recorded, during the user-generated video is recorded or at a later point in time, e.g. on request by the user 4.

In the embodiment when the processing is made by a control unit 2' positioned in a cloud or network, each sensor may have its own network or cloud connection. Each sensor may either be directly connected to an internet-enabled network or be arranged in a mesh network where at least one node has access to the network or cloud where the control unit 2' is located.

A further embodiment may a downhill skier has placed an action camera (the camera device) on the helmet to capture a run down the mountain. The run is about 10 minutes long, and involves different obstacles like jumps, trees, high-speed sections, sharp turns and deep powder snow. The skier also wears wearable sensors that captures position, speed, elevation and various bio data. The sensors may be located in a mobile phone and in various fitness sensors and other equipment the user wears. At the end of the day, the skier transfers the movie and the sensor data from the action camera to his/her computer or to a network where a control unit ads a soundtrack to the movie clip. The addition of soundtrack may, however, also be made locally in the control unit 2 as in the embodiments described in connection to FIGS. 1a and 1b.

Examples of selection of music and processing of sensor data may include: in sections of the movie where the skier has low pulse and low speed, more calm music patterns are added; in sections with higher speed or pulse is registered, more intense music patterns are added; and/or in jumps or drops, finally, very dramatic sound patterns are added.

Figure 2:
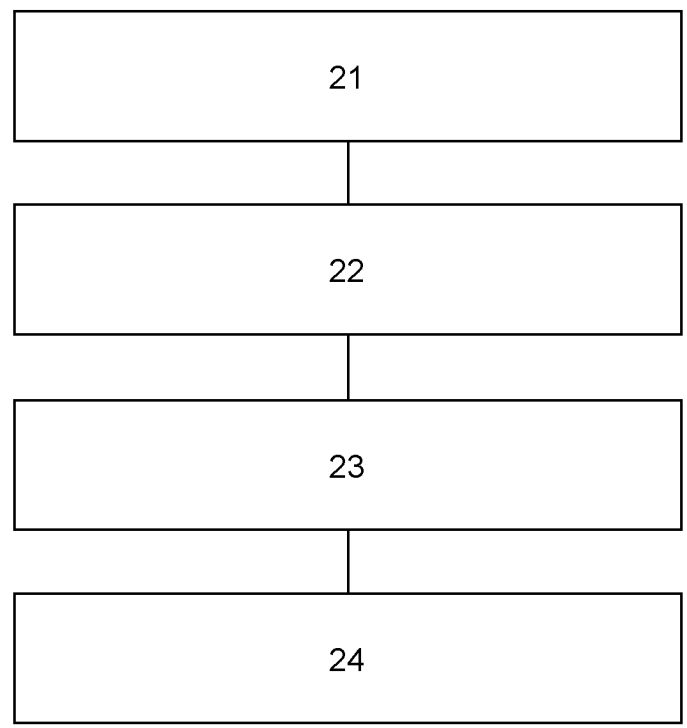
FIG. 2 is a block diagram illustrating a method for automatically creating a soundtrack.

FIG. 2 illustrates the method for automatically creating a soundtrack. The method comprises a step 21 of recording a user-generated video and, simultaneously, gathering data from at least one wearable sensor attached to a user. The method further comprises the step 22 of communicating the user-generated video and the data to a control unit, and the step 23 of processing the gathered data in relation to a time-line of the user-generated video in the control unit. Optionally the step 23 also comprises calculating a property of the user based on the gathered data and processing the user-generated video by performing image analysis of the user-generated video. The method further method further comprises the step 24 of generating the soundtrack based on the processed data. The step 24 may further comprise selecting music based on at least one music property in relation to said processed data and the time-line thereof, the music property being e.g. tempo, rhythm, melodic tension, consonance/dissonance, instrumentation, chord structure, and/or key changes. E.g. if the movement of the user 4 is slow, music with a slow tempo and/or with low intensity may be selected while if the user e.g. runs fast or has a high pulse, intense music with higher tempo will be selected.

The skilled person realizes that a number of modifications of the embodiments described herein are possible without departing from the scope of the invention, which is defined in the appended claims.

For instance, the mobile device in FIG. 1b and the camera device 1 in FIG. 1b may both be smart phones. The network embodiment of FIG. 1b may further also be implemented in the system shown in FIG. 1a.

The invention claimed is:

1. System for automatically creating a soundtrack, comprising
   a camera device for recording a user-generated video,
   at least one wearable sensor, and
   a control unit in communication with the camera device and the at least one wearable sensor,
   wherein the control unit is adapted to generate the soundtrack for the user-generated video by selecting music based on data gathered from the at least one wearable sensor during the recording of the user-generated video.

2. The system according to claim 1, wherein the control unit comprises a clock.

3. The system according to claim 1, wherein the at least one sensor is a sensor comprised in the group consisting of:
   an accelerometer, a gyro, a magnetometer, a barometer, a galvanic skin response sensor, a brain response sensor, facial electromyography sensors, visual aesthetics sensor, electroencephalogram (EEG) sensor, electrocardiogram (ECG) sensor, electromyogram (EMG) sensor, mechanomyogram (MMG) sensor, electrooculography (EOG) sensor, magnetoencephalogram (MEG) sensor, a pulse meter, a positioning device, and a blood analysis sensor.

4. Method for automatically creating a soundtrack, comprising the steps of:
   recording a user-generated video and, simultaneously, gathering data from at least one wearable sensor attached to a user,
   communicating the user-generated video and the data to a control unit,
   processing the gathered data in relation to a time-line of the user-generated video in the control unit, and
   generating the soundtrack for the user-generated video by selecting music based on at least one music property in relation to the processed data and the time-line thereof.

5. The method according to claim 4, wherein the step of generating the soundtrack is performed in real time as the user-generated video is recorded.

6. The method according to claim 4, wherein the step of processing is further based on image analysis of the user-generated video.

7. The method according to claim 4, wherein the step of processing the gathered data further comprises calculating a property of the user comprised in the group consisting of:
   speed, acceleration, vertical velocity, deceleration, impact, duration time, pulse, and blood sugar.

8. The method according to claim 4, wherein said music property is a music property comprised in the group consisting of:
   tempo, rhythm, melodic tension, consonance/dissonance, instrumentation, chord structure, and/or key changes.

9. A non-transitory computer readable medium storing a computer program comprising instructions adapted to carry out the method of claim 4 when executed by a device having processing capability.

10. The method of claim 4, further comprising:
    saving the user-generated video as a video file; and
    embedding the soundtrack into the video file.

* * * * *